US011868180B2

(12) United States Patent
Reinger

(10) Patent No.: US 11,868,180 B2
(45) Date of Patent: Jan. 9, 2024

(54) DOCKING STATION WITH WIRELESS CHARGING

(71) Applicant: Tecflower AG, Feusisberg (CH)

(72) Inventor: Sascha Reinger, Feusisberg (CH)

(73) Assignee: Tecflower AG, Feusisberg (CH)

( * ) Notice: Subject to any disclaimer, the term of this patent is extended or adjusted under 35 U.S.C. 154(b) by 374 days.

(21) Appl. No.: 17/416,969

(22) PCT Filed: Dec. 16, 2019

(86) PCT No.: PCT/EP2019/085360
§ 371 (c)(1),
(2) Date: Jun. 21, 2021

(87) PCT Pub. No.: WO2020/127058
PCT Pub. Date: Jun. 25, 2020

(65) Prior Publication Data
US 2022/0107667 A1   Apr. 7, 2022

(30) Foreign Application Priority Data
Dec. 21, 2018   (CH) ...................................... 01592/18

(51) Int. Cl.
*G06F 1/16*   (2006.01)
*H02J 50/10*   (2016.01)
*H04B 5/00*   (2006.01)

(52) U.S. Cl.
CPC ............ *G06F 1/1632* (2013.01); *H02J 50/10* (2016.02); *H04B 5/0037* (2013.01); *H04B 5/0081* (2013.01)

(58) Field of Classification Search
CPC .................................................. G06F 1/1632
See application file for complete search history.

(56) References Cited

U.S. PATENT DOCUMENTS 9,819,216 B2 * 11/2017 Klawon .................. H02J 50/10
9,921,618 B2 *  3/2018 Magi ..................... G06F 1/1632
(Continued)

FOREIGN PATENT DOCUMENTS

DE    10 2010 043154 A1    5/2012
DE    10 2012 213363 A1    1/2014
(Continued)

OTHER PUBLICATIONS

International Search Report, dated Mar. 20, 2020, and Written Opinion for PCT/EP2019/085360 filed Dec. 16, 2019.
(Continued)

*Primary Examiner* — Lisa Lea-Edmonds
(74) *Attorney, Agent, or Firm* — Paul D. Bianco; Fleit Intellectual Property Law

(57) ABSTRACT

A docking station comprises a computing unit and a charging system connected via a data connection. The charging system has a first charging coil in a housing such that a battery of a mobile device can be charged by a second charging coil while at the same time data can be transferred between the mobile device and the computing unit and to at least one peripheral device, whereby an increased protection against eavesdropping results without the use of additional devices. This is achieved in that the first and second charging coils are designed and connected such that the charging coils are actuated by the computing unit and by a mobile device electronic system such that data to be transferred is transmitted between the mobile device and the docking station via alternating fields, which are generated and received in the first and second charging coils, in the near-field region in an interference-free and eavesdropping-secured manner.

11 Claims, 2 Drawing Sheets

(56) References Cited

U.S. PATENT DOCUMENTS

| | | | | |
|---|---|---|---|---|
| 10,003,384 B2* | 6/2018 | Kiszka | ........... | H04L 9/0861 |
| 10,461,581 B2* | 10/2019 | Klawon | ........... | G06F 1/1632 |
| 2013/0236192 A1* | 9/2013 | Deicke | ........... | H02J 7/00047 |
| | | | | 398/135 |
| 2014/0021909 A1* | 1/2014 | Klawon | ........... | H02J 50/10 |
| | | | | 320/108 |
| 2014/0242911 A1* | 8/2014 | Holtman | ........... | H01Q 1/243 |
| | | | | 455/41.1 |
| 2015/0221414 A1* | 8/2015 | Matsuoka | ........... | G06F 1/26 |
| | | | | 174/70 R |
| 2015/0270874 A1* | 9/2015 | Kiszka | ........... | G06F 1/1632 |
| | | | | 455/557 |
| 2016/0072327 A1* | 3/2016 | Knutson | ........... | H04W 88/02 |
| | | | | 320/108 |
| 2017/0185112 A1* | 6/2017 | Magi | ........... | G06F 1/20 |
| 2021/0002170 A1* | 1/2021 | Chien | ........... | C03B 27/012 |

FOREIGN PATENT DOCUMENTS

| | | | |
|---|---|---|---|
| EP | 2745351 | A1 | 6/2014 |
| EP | 3288110 | A1 | 2/2018 |

OTHER PUBLICATIONS

Written Opinion dated Apr. 3, 2020, for PCT/EP2019/085360, filed Dec. 16, 2019 (English translation).

* cited by examiner

DOCKING STATION WITH WIRELESS CHARGING

TECHNICAL FIELD

The present invention describes a docking station, comprising a computing unit and an electronic charging system which is connected to the computing unit via a data connection, the electronic charging system having at least one first charging coil in a housing, such that a battery of a dockable mobile device can be charged by means of at least one second charging coil, while at the same time data can be transferred between a memory unit of the mobile device and the computing unit and to at least one peripheral device via outputs on the computing unit, as well as a method for docking a mobile device to at least one peripheral device by means of a docking station and a method for transferring data between a mobile device electronic system of a wirelessly chargeable mobile device and a computing unit of a docking station.

BACKGROUND

Since almost every user today carries a smartphone or tablet as mobile device with enormous computing power, this also ought to be used as personal workplace computer in the interest of simplicity. The current mobile devices are powerful enough that all applications from ordinary office application through 3D-CAD-drawing programs and even video editing are actually already capable of running on handheld mobile devices. The user then always has all of his or her data and can do without additional computers, such as laptops or desktop computers. Input on a touchscreen and a smaller touch-sensitive screen are naturally a problem and the view on such touchscreens is difficult and must often be enlarged during use. Docking stations were introduced to use mobile devices permanently as working computers.

Docking stations are devices that provide a connection of mobile devices with peripherals, such as a screen, computer mouse or sound system. Connection used to occur exclusively by means of cable or through plug-in attachments that could be connected to the jacks on mobile devices. The docking station is supplied by the power grid and can also charge a connected mobile device or its battery.

The Samsung DeX Pad, for example, uses a physical coupling in the form of a plug-in connection in order transfer data from the mobile device to a screen, in which case a hardwired charging function also exists between the docking station and mobile device. Since the mobile device is directly connected via cable to the docking station, unauthorized eavesdropping of data transfer between the mobile device and docking station is ruled out.

The drawbacks of a physical connection of a mobile device to or in a docking station were already recognized in EP2745351. The Wi-Fi standard was chosen as a way out for data transmission during connection of the mobile device to the docking station. The docking station and the mobile device have means to exchange data in the frequency range of a WLAN network.

This docking station in augmented embodiments also have the capability of wireless charging of the mobile device when it is positioned close to the docking station, in which case it is not clear whether wireless charging and data transmission are occurring simultaneously via WLAN. It was recognized in EP2745351 that radio signals from the surroundings can interfere in the docking station, leading to problems during data transmission. The solution was to introduce a device to reduce antenna efficiency in the docking station or in the mobile device, which can eliminate the interference. This additional device comes with additional hardware expense, however, and might dissuade buyers from purchasing mobile devices and/or docking stations suitable for this purpose. Another aspect, however, is also the eavesdropping security of a coupled mobile device in a docking station. When the docking station and the mobile device are connected in a WLAN network, it would be possible for anyone who has gained unauthorized access to the same WLAN network to eavesdrop on the data transmissions. This unauthorized person need only be in the same WLAN network but not in the immediate vicinity of the docking station. EP2745351 cannot prevent such unauthorized eavesdropping over greater distance.

No solution for an eavesdropping-secure docking station with wireless charging function and wireless data transmission between the docking station and mobile device has thus far been presented.

SUMMARY OF THE INVENTION

One aspect of the present invention relates to the devising of a docking station for wireless power and date exchange between the docking station and a mobile device, whose eavesdropping security is increased while no additional device need be attached to the docking station or the mobile device. The mobile device can thereby be used as a personal workplace computer without the user having to fear unauthorized eavesdropping of his data.

Accordingly, various embodiments of a docking station are disclosed herein.

BRIEF DESCRIPTION OF THE DRAWINGS

A preferred embodiment example of the object of the invention is described below in conjunction with the appended drawings.

FIG. 1 shows a schematic view of a docking station with docked mobile device and various peripheral devices, whereas

DETAILED DESCRIPTION

Figure 1:
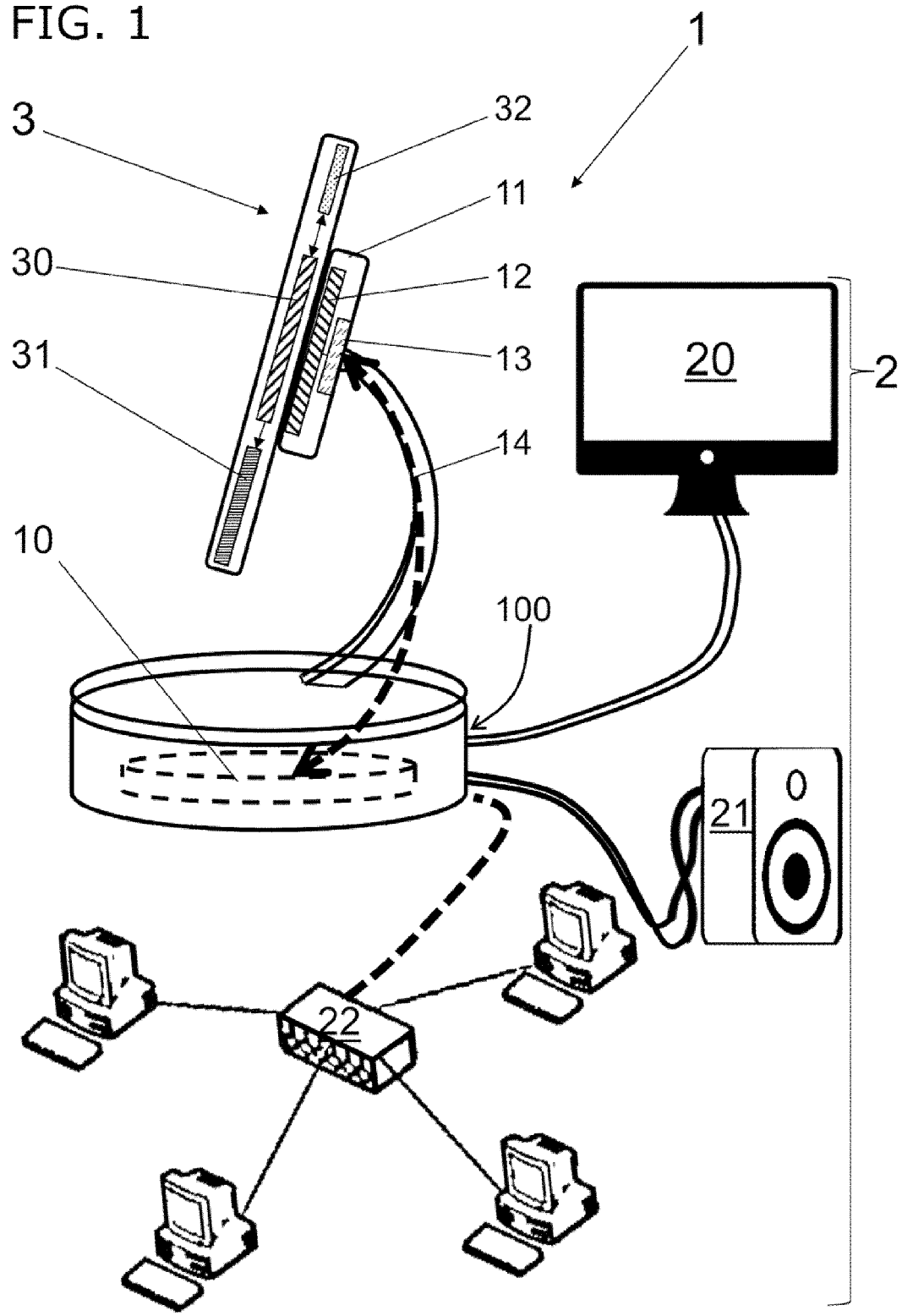

A docking station 1 is described here, to which a mobile device 3, especially a smartphone or tablet computer can be docked, through which the mobile device 3 can be connected to peripheral devices 2. This docking station 1 includes a wireless charging function, with whose components data transmission secure from eavesdropping is additionally made possible via electromagnetic waves or via radio communication between the mobile device 3 and docking station 1. Whereas wireless charging can occur at a distance of as much as five centimeters between mobile device 3 and docking station 1, data transmission can occur at a distance of up to five meters.

The docking station 1 comprises a computing unit 10 equipped with outputs 100, to which peripheral devices 2, including screen 20, sound system 21 or computer network 22 can be connected. In addition to computing unit 10, the docking station 1 comprises a retaining housing 11, which is spatially separated from computing unit 10 and connected via a data connection 14. At least one first charging coil 12 is arranged in retaining housing 11. Electronic charging system 13, also arranged here in retaining housing 11, is provided to control the at least one first charging coil 12. The electronic charging system 13, however, can also be arranged in the computing unit 10 or be part of computing unit 10. Inductive charging is produced via corresponding cables from the electronic charging system 13 to the first charging coil 12 by the corresponding generation of inductive currents in the first charging coil 12 at frequencies in the kHz range.

At least one second charging coil 30, a battery 31 and a mobile device 3 electronic system 32 must be built into the mobile device being docked, so that wireless charging can occur when mobile device 3 is docked to retaining housing 11. If the distance between mobile device 3 and retaining housing 11 or between the first and second charging coils 12, 30 is less than or equal to five centimeters, wireless charging can occur.

Figure 2:
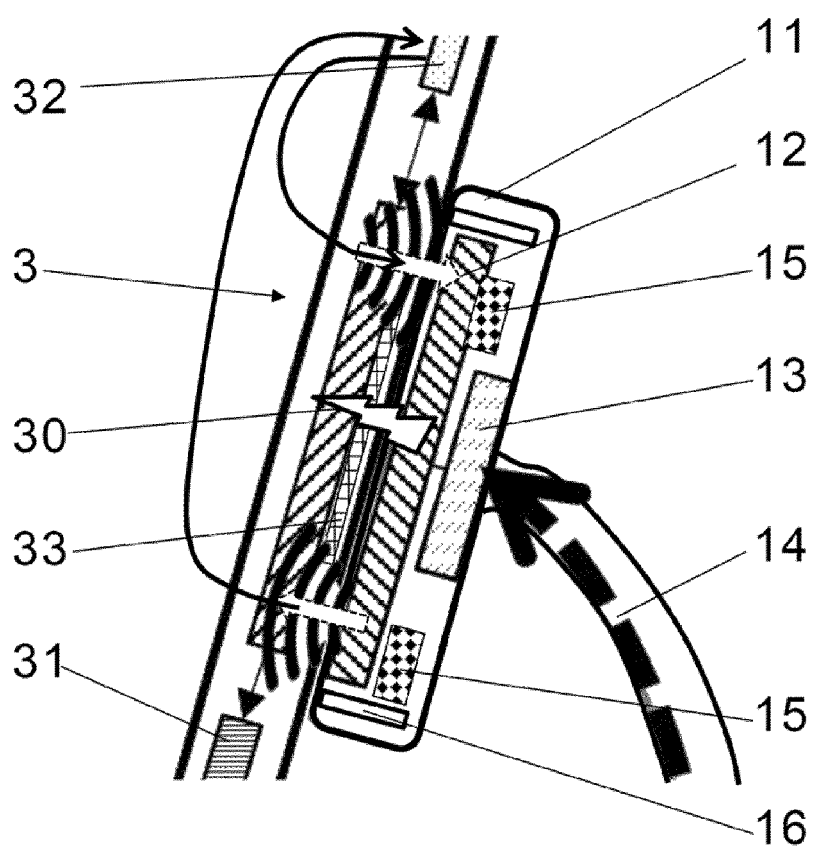
FIG. 2 shows a schematic detailed X-ray view of the docking area between the mobile device and docking station.
Figure 3:
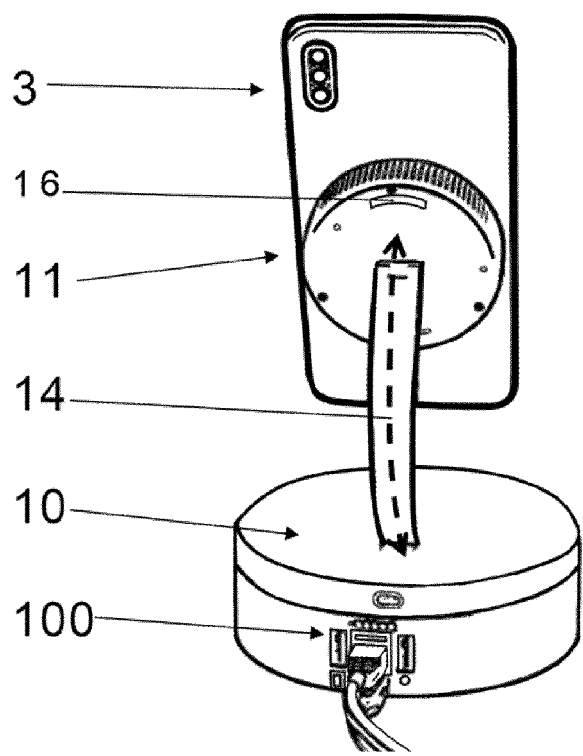
FIG. 3 shows a schematic rear view of the docking station with docked mobile device.

Due to an applied AC voltage controlled by the electronic charging system 13 and induced currents in the first charging coil 12, the at least one first charging coil 12 induces currents in the second charging coil 30 in mobile device 3. The currents induced in the second charging coil 30 charge the battery 31 of mobile device 3, the charging being controlled by mobile device electronic system 32. The induction that is preferably reached by resonant inductive coupling of the first and second charging coils 12, 30 is schematically depicted by a lightning bolt in FIG. 2. A power of a few watts is released here from the first charging coil 12 to the second charging coil 30.

At least one mobile device magnet 33 is arranged on mobile device 3 and at least one retention magnet 15 on or in retaining housing 11 to secure the mobile device 3 on retaining housing 11. The at least one retention magnet 15 is preferably designed as an open ring. To prevent overheating of mobile device 3 and/or retaining housing 11 during wireless charging, cooling slots 16 are arranged on retaining housing 11, permitting cooling air circulation.

Data transmission also occurs wirelessly between the at least one first charging coil 12 and the at least one second charging coil 30 of the wireless charging device, in which case a data transmission rate of at least 100 kbit/s, preferably several Mbps should be reached. Smooth screen display cannot otherwise be achieved on a connected screen 20 with docked mobile device 3. Both charging coils 12, 30 additionally serve here as data transmission antennas that each can emit and receive radio signals so that a data stream can be sent in both directions. The sent data signals are depicted as wave symbols in FIG. 2 between first charging coil 12 and second charging coil 30, each with its own arrow direction. Both charging coils 12, 30 are used as transmitting and receiving coils, in addition to charging. In order for data to be transmitted, mobile device 3 and docking station 1, and therefore the first charging coil 12 and the second charging coil 30, may be five meters apart at most.

The computing unit 10 of the docking station and the mobile device electronic system 32 of mobile device 3 are not connected via both charging coils 12, 30 to a radio network in the surroundings, but radio signals are directly transmitted between charging coils 12, 30 over a limited region of 5 meters radio range at most. Accordingly, radio transmission of data can only occur if the distance between mobile device 3 and docking station 1 is five meters at most.

Radio signals received from the first charging coil 12 are sent to electronic charging system 13 and to the computing unit 10 via data connection 14, where the signals are fed the peripheral devices 2. Data signals acquire the opposite direction by wire from peripheral devices 2 to computing unit 10 via data connection 14, electronic charging system 13 and the first charging coil 12, before the data are sent wirelessly from the first charging coil 12 to the at least one second charging coil 30. After being received in charging coil 30, the data are sent by wire to the mobile device electronic system 32, where the data can be processed. A computer program takes care of wireless data transmission and reception between charging coils 12, 30 at mobile device electronic system 32 and computing unit 10, respectively.

In order for computing unit 10 to remain as undisturbed as possible by radio signals, the computing unit 10 is preferably spatially separated from retaining housing 11 and charging coils 12, 30.

A known local radio network according to a known standard is deliberately not used for data exchange between mobile device 3 and docking station 1, so that data exchange between mobile device 3 and docking station 1 is secure from eavesdropping over a short distance. Even if an unauthorized person were to slip into the radio network between charging coils 12, 30, they would have to remain at a limited distance from the charging coils 12, 30 in order to retrieve data.

The charging coils 12, 30 fulfill a dual function here. Data transmission secure from eavesdropping with data rates to a few Gbps can also be achieved here with the same means that are used for wireless charging. Configurations of charging coils 12, 30 so that radio signals with such high data rates can be sent and received are known. Appropriate embodiments of charging coils 12, 30 are known to one skilled in the art.

Wireless charging is preferably controlled so that the mobile device electronic system 32 recognizes when charging must be activated. The electronic connection between mobile device 3 and docking station 1 is wireless, wherein no ordinary protocol is used for data transfer and transmission/reception is performed on both sides by the induction coils or charging coils 12, 30. Methods [are known] for transferring data between a mobile device electronic system 32 and a wirelessly chargeable mobile device 3 and a computing unit 10 of a docking station 1 by setting up a radio network between the at least one first charging coil 12 and the at least one second charging coil 30 at a distance of less than five meters and a data transmission rate of at least 100 kbps with the same charging coils 12, 30 that also take care of wireless charging.

The components of docking station 1 are built into a housing of a screen or tablet computer in a preferred embodiment of docking station 1. For example, the retaining housing 11 can be part of a housing of a screen or tablet computer, so that coupling of mobile device 3 to this housing also occurs. The computing unit 10 can be incorporated in the housing of the screen or tablet computer, whereas the retaining housing 11 is spatially separated from the housing of the screen or tablet computer but remains connected to the housing. The retaining housing 11 then forms a rack for mobile device 3 in the vicinity of the screen or tablet computer. The docking station 1 or the components of docking station 1 in this embodiment are not only electronically connected to at least one screen or tablet computer, but also mounted in the housing of the screen or tablet computer.

LIST OF REFERENCE NUMBERS

1 Docking station with wireless charging function
10 Computing unit

100 Outputs (USB/USB-C/LAN/HDMI/etc.)
11 Retaining housing
12 at least one first charging coil (first transmitting and receiving coil)
13 Electronic charging system
14 Data connection to computing unit
15 Retaining magnet
16 Cooling slot in housing
2 Peripheral device
   20 Screen
   21 Sound system/audio amplifier and/or speakers
   22 Computer network
3 Mobile device
   30 at least one second charging coil (second transmitting and receiving coil)
   31 Battery
   32 Mobile device electronic system
   33 Mobile device magnet

The invention claimed is:

1. A docking station comprising a computing unit and an electronic charging system connected by a data connection to the computing unit,
wherein the electronic charging system has at least one first charging coil in a retaining housing such that a battery of a dockable mobile device is chargeable by at least one second charging coil, while at the same time data is transferrable between a memory of mobile device and the computing unit and to at least one peripheral device via outputs on the computing unit,
wherein the at least one first charging and the at least one second charging coils are designed and connected so that they are activatable by the computing unit and by a mobile device electronic system, such that the data being transferred between the mobile device and the docking station is transmittable by means of the at least one first charging and the at least one second charging coils via alternating fields generated and received in the at least one first and second charging coil in the near-field region and the data is sendable to at least one peripheral device connected to docking station.

2. The docking station according to claim 1, wherein data can be directly transmitted from the computing unit through the at least one first charging coil via the at least one second charging coil and the mobile device electronic system and back again, in which case a distance between the at least one first charging coil and the at least one second charging coil is as much as five meters.

3. The docking station according to claim 1, wherein the computing unit is spaced from the electronic charging system and the at least one first charging coil is arranged and a cable connection exists between the electronic charging system, the at least one first charging coil and the computing unit.

4. The docking station according to claim 1, wherein at least one retaining magnet is arranged in the retaining housing, the at least one retaining magnet effectively connectable to a mobile device magnet as the mobile device approaches the docking station.

5. The docking station according to claim 1, wherein at least one cooling slot is made in the retaining housing that releases excess heat during wireless charging of the battery of the mobile device.

6. The docking station according to claim 1, wherein all components of the docking station are integrated in a housing of a screen or tablet or are a part of a housing of a screen or tablet.

7. The docking station according to claim 6, wherein the retaining housing protrudes from the housing of the screen or tablet or forms a part of the housing of the screen or tablet.

8. A method for docking a mobile device to at least one peripheral device by means of the docking station according to claim 1, the method comprising:
docking a mobile device on the retaining housing of the docking station by means of magnetic retention of at least one retaining magnet in the retaining housing and at least one mobile device magnet on the mobile device,
exchanging data between the mobile device electronic system and the computing unit of the docking station with simultaneous wireless charging of the battery of the mobile device,
wherein data exchange and wireless charging occur between the docking station and the mobile device by emission and reception of electromagnetic waves from the at least one first charging coil and the at least one second charging coil.

9. The method according to claim 8, wherein wireless charging and data transmission only occur simultaneously if a distance between the at least one first charging coil and the at least one second charging coil is less than five centimeters.

10. The method according to claim 8, wherein data transmission secure from eavesdropping occurs directly via the data connection between the at least one charging coil and the computing unit before the data are transmitted by wire to the at least one peripheral device through outputs on the computing unit.

11. A method for transfer of data between a mobile device and the docking station according to claim 1, the method comprising:
setting up a wireless circuit to transfer data between a mobile device electronic system of a wirelessly chargeable mobile device and the computing unit of the docking station,
wherein the wireless circuit is secure from eavesdropping and is produced between the at least one first charging coil and the at least one second charging coil at a distance of less than five meters and a data transmission rate of at least 100 kbps with the at least one first and at least one second charging coils that also ensure wireless charging.

\* \* \* \* \*